(12) United States Patent
Dinh

(10) Patent No.: US 11,501,542 B2
(45) Date of Patent: Nov. 15, 2022

(54) UNIFIED READING SOLUTION FOR VEHICLES

(71) Applicant: VIGILANT SOLUTIONS, LLC, Livermore, CA (US)

(72) Inventor: Tien Son Dinh, District 3 (VN)

(73) Assignee: VIGILANT SOLUTIONS LLC, Livermore, CA (US)

(*) Notice: Subject to any disclaimer, the term of this patent is extended or adjusted under 35 U.S.C. 154(b) by 253 days.

(21) Appl. No.: 17/036,747

(22) Filed: Sep. 29, 2020

(65) Prior Publication Data

US 2022/0101031 A1  Mar. 31, 2022

(51) Int. Cl.
| | |
|---|---|
| *G06V 20/62* | (2022.01) |
| *G08G 1/017* | (2006.01) |
| *G06K 9/62* | (2022.01) |
| *G06V 10/56* | (2022.01) |
| *G06V 30/10* | (2022.01) |

(52) U.S. Cl.
CPC ........... *G06V 20/62* (2022.01); *G06K 9/6201* (2013.01); *G06V 10/56* (2022.01); *G08G 1/0175* (2013.01); *G06V 20/625* (2022.01); *G06V 30/10* (2022.01)

(58) Field of Classification Search
CPC ...... G06V 20/62; G06V 10/56; G06V 20/625; G06K 9/6201; G08G 1/0175
USPC ........................................................ 382/195
See application file for complete search history.

(56) References Cited

U.S. PATENT DOCUMENTS

| | | | |
|---|---|---|---|
| 8,218,822 B2 | 7/2012 | Sefton | |
| 8,781,172 B2 | 7/2014 | Kozitsky et al. | |
| 9,881,211 B2* | 1/2018 | Johansson | G06V 20/00 |
| 2012/0155712 A1 | 6/2012 | Paul et al. | |
| 2018/0189590 A1* | 7/2018 | Fuchigami | G06V 20/588 |
| 2018/0268238 A1 | 9/2018 | Khan et al. | |
| 2019/0066492 A1 | 2/2019 | Nijhuis | |
| 2019/0080003 A1 | 3/2019 | Alcantara et al. | |
| 2019/0180132 A1* | 6/2019 | Grunzinger, Jr. | G06V 20/62 |

OTHER PUBLICATIONS

Gupta, Mayank et al.: "Zero Shot License Plate Re-Identification", Conference: 2019 IEEE Winter Conference on Applications of Computer Vision (WACV), Jan. 2019, all pages.
Rodriguez-Serrano, Jose A., et al.: "Data-Driven Vehicle Identification by Image Matching", Conference European Conference on Computer Vision, Oct. 2012, all pages.

* cited by examiner

*Primary Examiner* — Ayodeji O Ayotunde

(57) ABSTRACT

A method, system and computer program product for progressively updating at least one matrix of license plate identification values is disclosed. At a vehicle presence time, an image is captured within which is shown a uniquely identifiable license plate of a vehicle. Analytics is carried out on the image to obtain, in relation to the uniquely identifiable license plate, at least four values in relation to both a license plate number and at least one additional plate-identifying information. The matrix of license plate identification values is populated with the at least four values and stored in a database.

20 Claims, 4 Drawing Sheets

UNIFIED READING SOLUTION FOR VEHICLES

BACKGROUND

Automatic License Plate Recognition (ALPR) is a technology that, amongst other things, uses optical character recognition on images to read vehicle registration plates to create vehicle identification data. An ALPR system can use existing closed-circuit television, road-rule enforcement cameras, or cameras specifically designed for the task. An ALPR system can also include a server with storage to store the images captured by the cameras as well as the text from the license plate. As ALPR systems become more and more advanced over time, the expectation for them to provide more detailed and consistently reliable information is increasing.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
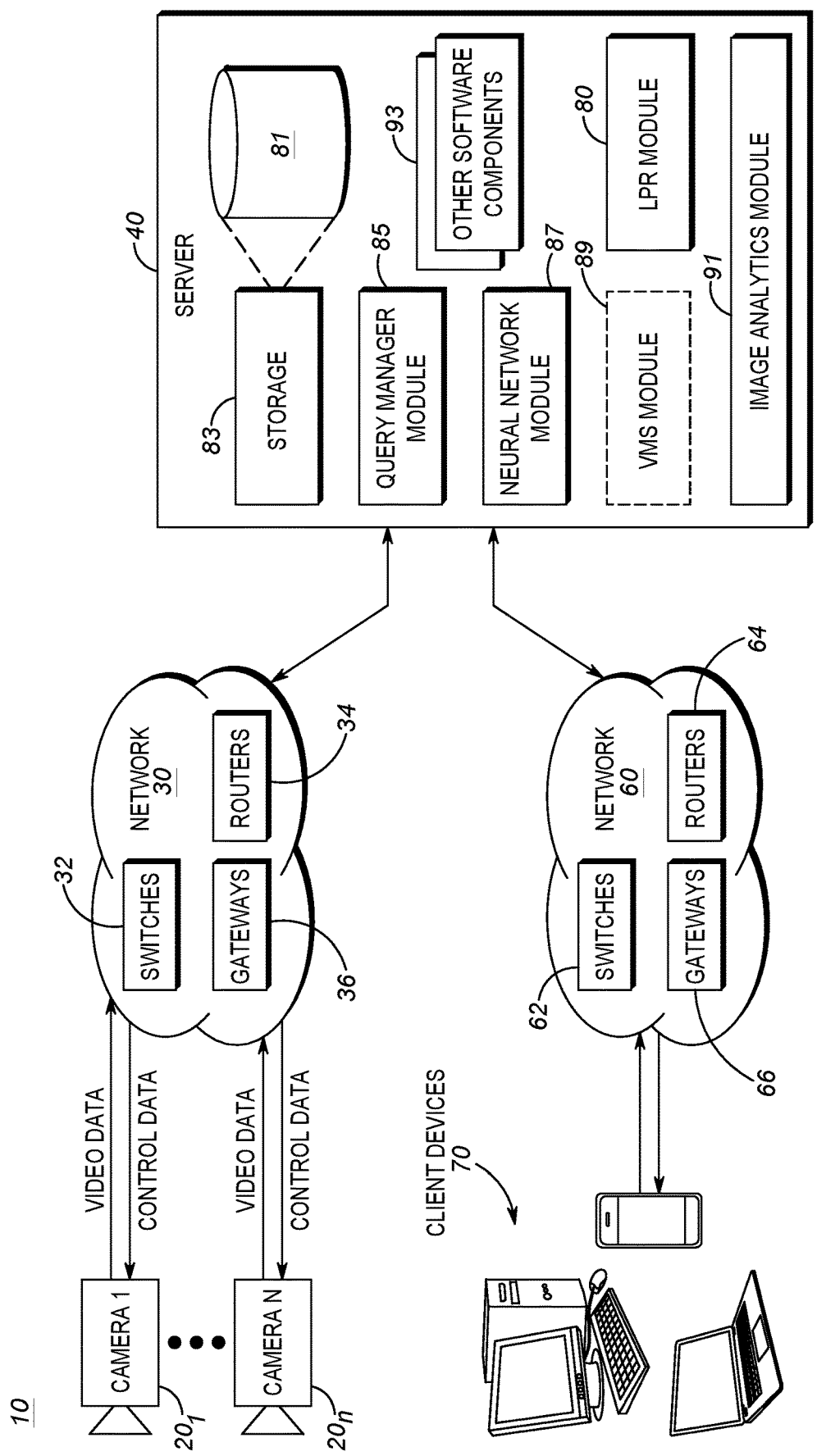
FIG. 1 is a block diagram of a system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer-implemented method for progressively updating at least one matrix of license plate identification values stored in a database. The method includes capturing, at a first vehicle presence time, a first image within which is shown a uniquely identifiable license plate of a vehicle. The method also includes carrying out analytics on the first image to obtain, in relation to the uniquely identifiable license plate, at least four values in relation to both a license plate number and at least one additional plate-identifying information. The at least four values include a first value that is obtained from a first automated analysis of the first image, a second value that is a first confidence score as to the first value matching the license plate number, a third value that is obtained from a second automated analysis of the first image, and a fourth value that is a second confidence score as to the third value matching the additional plate-identifying information. The method also includes populating the matrix of license plate identification values with the at least four values. The method also includes capturing, at a second vehicle presence time, a second image within which is shown the uniquely identifiable license plate of the vehicle, the second vehicle presence time being later in time than the first vehicle presence time. The method also includes determining that there is a license plate match as between the first image and the second image. The method also includes carrying out analytics on the second image to obtain, in relation to the uniquely identifiable license plate, at least four additional values in relation to both the license plate number and the at least one additional plate-identifying information. The at least four additional values include a fifth value that is obtained from a third automated analysis of the second image, a sixth value that is a third confidence score as to the fifth value matching the license plate number, a seventh value that is obtained from a fourth automated analysis of the second image, and an eighth value that is a fourth confidence score as to the seventh value matching the additional plate-identifying information. The method also includes carrying out a first comparison of the first confidence score to the third confidence score to establish a first replacement indicator only when the third confidence score is higher than the first confidence score. The method also includes selectively replacing, within the matrix of license plate identification values, the first value with the fifth value based on whether or not the first replacement indicator has been established. The method also includes carrying out a second comparison of the second confidence score to the fourth confidence score to establish a second replacement indicator only when the fourth confidence score is higher than the second confidence score. The method also includes selectively replacing, within the matrix of license plate identification values, the third value with the seventh value based on whether or not the second replacement indicator has been established.

According to another example embodiment, there is provided a system that includes a first camera configured to capture, at a first vehicle presence time, a first image within which is shown a uniquely identifiable license plate of a vehicle. The system also includes a second camera configured to capture, at a second vehicle presence time, a second image within which is shown the uniquely identifiable license plate of the vehicle. The second vehicle presence time is later in time than the first vehicle presence time. The system also includes a computer-readable medium having a database configured to store an at least one matrix of license plate identification values. The system also includes at least one processor communicatively coupled to the computer-readable medium. The at least one processor is configured to carry out analytics on the first image to obtain, in relation to the uniquely identifiable license plate, at least four values in relation to both a license plate number and at least one additional plate-identifying information. The at least four values include a first value that is obtained from a first automated analysis of the first image, a second value that is a first confidence score as to the first value matching the license plate number, a third value that is obtained from a second automated analysis of the first image, and a fourth value that is a second confidence score as to the third value matching the additional plate-identifying information. The at least one processor is also configured to populate the matrix of license plate identification values with the at least four values, and to determine that there is a license plate match as between the first image and the second image. The at least one processor is also configured to carry out analytics on the second image to obtain, in relation to the uniquely identifiable license plate, at least four additional values in relation to both the license plate number and the at least one additional plate-identifying information. The at least four additional values include a fifth value that is obtained from a third automated analysis of the second image, a sixth value that is a third confidence score as to the fifth value matching the license plate number, a seventh value that is obtained from a fourth automated analysis of the second image, and an eighth value that is a fourth confidence score as to the seventh value matching the additional plate-identifying information. The at least one processor is also configured to carry out a first comparison of the first confidence score to the third confidence score to establish a first replacement indicator only when the third confidence score is higher than the first confidence score. The at least one processor is also configured to selectively replace, within the matrix of license plate identification values, the first value with the fifth value based on whether or not the first replacement indicator has been established, and to carry out a second comparison of the second confidence score to the fourth confidence score to establish a second replacement indicator only when the fourth confidence score is higher than the second confidence score. The at least one processor is also configured to selectively replace, within the matrix of license plate identification values, the third value with the seventh value based on whether or not the second replacement indicator has been established.

Each of the above-mentioned embodiments will be discussed in more detail below, starting with example system and device architectures of the system in which the embodiments may be practiced, followed by an illustration of processing blocks for achieving an improved technical method, device, and system for a unified reading solution for vehicles. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The symbol "&" (ampersand) as used herein means "and".

Further advantages and features consistent with this disclosure will be set forth in the following detailed description, with reference to the figures.

Referring now to the drawings, and in particular FIG. 1, which is a block diagram of a system 10. The illustrated system 10 includes a plurality of cameras $20_1$-$20_n$ which are coupled to a network 30 (which may comprise a plurality of networks, even though shown as a single network in FIG. 1 for convenience of illustration). The network 30 can include the Internet, or one or more other public/private networks coupled together by communication elements: for example, one or more network switches 32, one or more routers 34, and/or one or more gateways 36. The network 30 could be of the form of, for example, client-server networks, peer-to-peer networks, etc. Data connections between any of the cameras $20_1$-$20_n$ and other network devices can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the cameras $20_1$-$20_n$ and the other illustrated network devices are within the same Local Area Network (LAN).

Still with reference to FIG. 1, the cameras $20_1$-$20_n$ communicate data and information to and from other network devices via the network 30. Two examples of such data and information, amongst other examples, are shown for convenience of illustration. For instance, the cameras $20_1$-$20_n$ transmit video data to one or more other network devices via the network 30. As another example, the cameras $20_1$-$20_n$ receive control data from other network devices via the network 30. In some example embodiments, the cameras $20_1$-$20_n$ are fixed-mounted types of video cameras such as, for instance, License Plate Recognition (LPR) cameras, Pan-Tilt-Zoom (PTZ) cameras, box cameras, bullet cameras, etc. In other example embodiments, the cameras $20_1$-$20_n$ are some other type of camera such as, for instance, body-worn cameras, police vehicle cameras, dash cameras, etc. Also, it will be understood that the cameras $20_1$-$20_n$ need not all be of homogeneous type, and any suitable combination of cameras of different types (i.e. a heterogeneous combination of cameras) is also contemplated.

One or more of the cameras $20_1$-$20_n$ are configured to capture images of vehicle license plates. From these vehicle license plate images, respective feature vectors may be generated either within the camera device or within another device forming part of the system 10. The application of feature vectors in the area of license plate recognition is similar to its application in other areas of analytics technology such as, for example, facial recognition technology. Also, in some examples the feature vector is an image signature that may be generated: over and around the license plate region in a captured image; over and around a vehicle of interest within a captured image, etc.

Two or more feature vectors can be compared. More specifically, a feature vector generated from a new or unknown image of a vehicle plate can be compared against one or more known feature vectors of respective one or more known images (also herein referred to as "reference" images) that depict a unique physical plate of a vehicle (front vehicle plate or rear vehicle plate, and excluding or including other parts of the vehicle to which the vehicle plate is attached) in order to verify if the new or unknown image matches the one or more reference images. Also, it will be understood that, over time, there may be a plurality of different feature vectors generated in respect of a unique physical plate of a vehicle (for example, based on these being generated from different captured images coming from different environments); however, if two feature vectors are sufficiently similar, a calculated determination can be made that these feature vectors are derived from the same vehicle plate.

In accordance with some examples, all license plate images collected by the system 10 can be organized into unique groups, where each group corresponds to images depicting a same physical license plate of some vehicle (it will be understood that each of the front vehicle plate and the rear vehicle plate may be considered to be a separate unique plate even though they are both attached to the same vehicle). By associating all feature vectors with respective groups, clustering of same or very similar feature vectors may be achieved. When a feature vector corresponding to a new or unknown vehicle plate image is generated, a particular cluster of the feature vectors may be selected for the purposes of feature vector comparison.

Also, in respect of some examples of grouping feature vectors, at least one feature vector may be a labelling feature vector within its group, while remaining feature vectors within the group may be non-labelling feature vectors. A labelling feature vector may be selected as such if, for example, the corresponding image generated a best confidence score in respect of a license plate identification value.

Still with reference to FIG. 1, shown therein is a server 40 which is coupled to the network 30 to receive data and information from other devices on the network 30 such as, for example, any of the cameras $20_1$-$20_n$. The server 40 is also coupled to any suitable number of client devices 70 via a network 60 in order that the server 40 may, for example, send and receive data and information between the client devices 70 and the server 40.

Regarding the network 60, this may comprise a plurality of networks even though shown as a single network in FIG. 1 for convenience of illustration. The network 60 can include the Internet, or one or more other public/private networks coupled together by communication elements: for example, one or more network switches 62, one or more routers 64, and/or one or more gateways 66. The network 60 could be of the form of, for example, client-server networks, peer-to-peer networks, etc. Data connections between any of the client devices 70 and other network devices can be any number of known arrangements for accessing a data communications network, such as, for example, dial-up SLIP/PPP, ISDN, dedicated lease line service, broadband (e.g. cable) access, DSL, ATM, Frame Relay, or other known access techniques (for example, RF links). Although in the illustrated example embodiment the network 30 and the network 60 are shown as separate, in some examples there may be some overlap and commonality between the network 30 and the network 60. In at least one example, the network 60 and the network 30 may be the same network.

Still with reference to FIG. 1, the illustrated server 40 includes an LPR module 80. The LPR module 80 enables various LPR-related functions including, for example, license plate localization, license plate sizing and orientation (adjusting), normalization, character segmentation, Optical Character Recognition (OCR) and syntactical/geometrical analysis. The server 40 also includes a database 81 maintained within storage 83. Amongst other things, the database 81 is organized storage for license plate information which may include, for example, license number, make/model, state, color, etc.

The server 40 also includes a query manager module 85 (provides any of the client devices 70 an interface for retrieving information from the database 81), a neural network module 87 (explained below), and an image analytics module 91 (explained later herein). The server 40 also includes other software components 93. These other software components will vary depending on the requirements of the server 40 within the overall system. As just one example, the other software components 93 might include special test and debugging software, or software to facilitate version updating of modules within the server 40.

Regarding the neural network module 87, this may include one or more Convolutional Neural Networks (CNNs) to provide for deep learning (through many images to realize a model of building a binary vector for every input image). The metric of this model is to permit verification as to whether two or more feature vectors are from a same vehicle with potentially high accuracy (similar the use of CNNs in connection with face recognition technology). Counter-intuitively the feature vector may be better than even have a "plate number" (i.e. read by OCR), as in some situations one may not be able to read a correct plate number, but a generated feature vector can continue to be linked to a correct vehicle.

Figure 2:
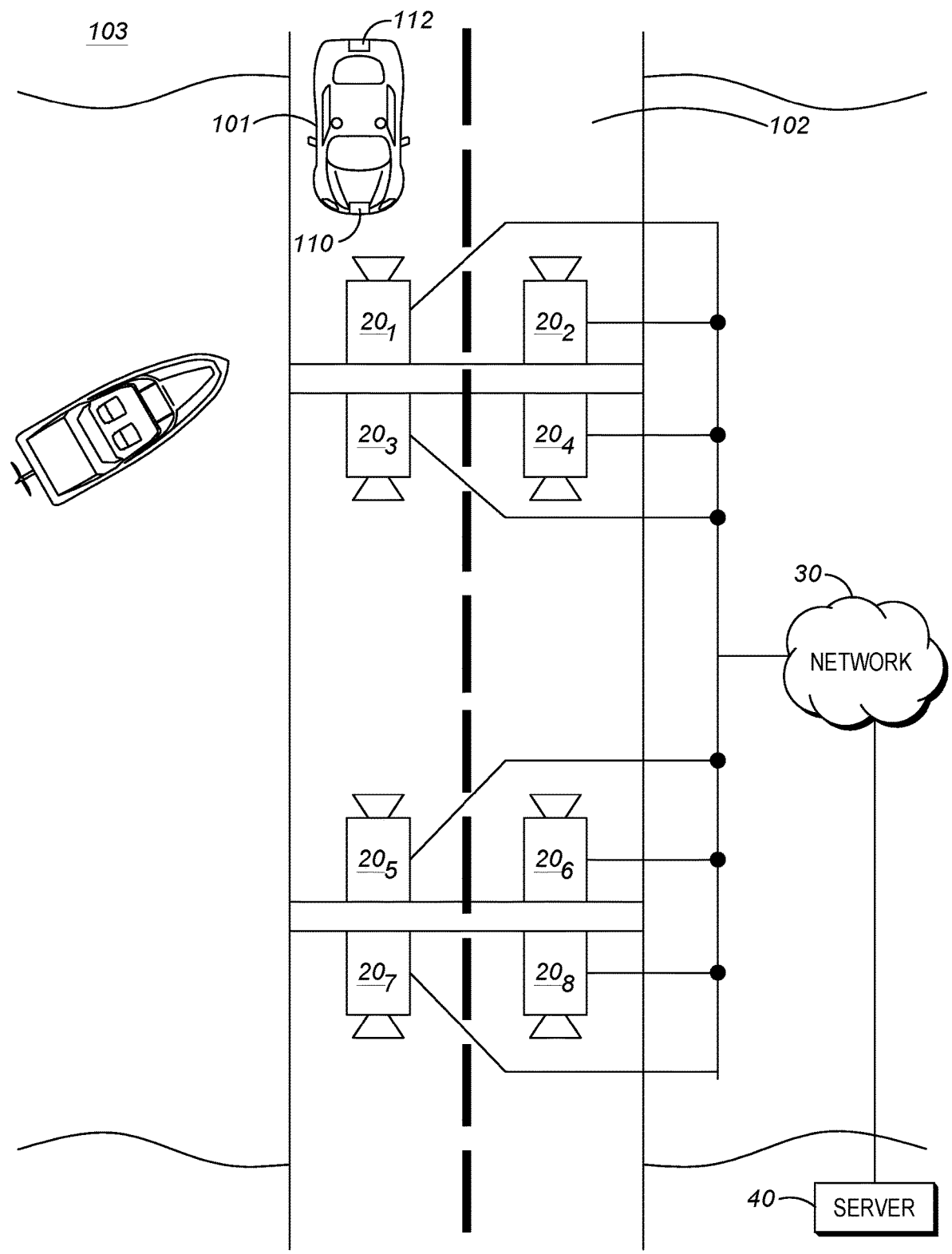
FIG. 2 is a schematic diagram of a practical implementation, in accordance with example embodiments, of the system of FIG. 1.

Reference is now made to FIG. 2. FIG. 2 is a schematic diagram of a practical implementation, in accordance with example embodiments, of the system of FIG. 1. In the illustrated example implementation, vehicle 101 is driving along road 102 in a geographic region 103 within which the system 10 is present. As the vehicle 101 continues to drive along the road 102, a front license plate 110 of the vehicle 101 passes within a Field of View (FOV) of LPR cameras (such as, for example, camera $20_1$ and camera 205). Also, a rear license plate 110 of the vehicle 101 passes within a Field of View (FOV) of LPR cameras (such as, for example, camera $20_3$ and camera $20_7$). During this time period, front and rear license plate images can be captured by a number of the cameras $20_1$-$20_8$, and these images are processed within the LPR module 80 (shown in FIG. 1 within the server 40; however this module need not be entirely within the server 40, and may alternatively be partly or entirely within another device such as, for example, some or all of the cameras $20_1$-$20_8$).

Still with reference to the example embodiment of FIG. 2, the LPR module 80 can operate to identify the license plate number (and thereby identify the registered owner) of the vehicle 101. The cameras $20_1$-$20_8$ are communicatively coupled to the network 30 which is in turn communicatively coupled to the server 40. The network 30 and the server 40 have been previously herein described in relation to FIG. 1.

Figure 3:
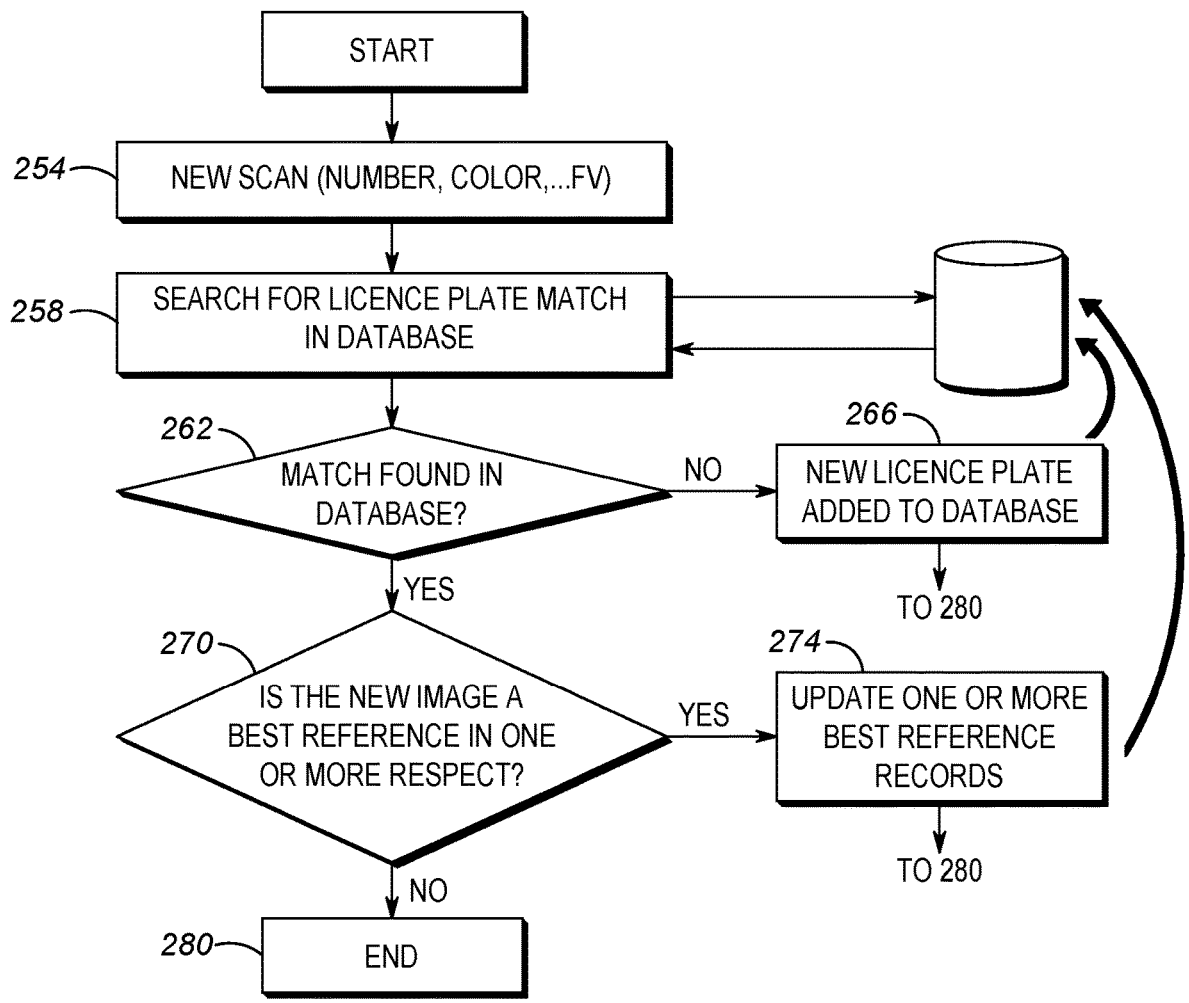
FIG. 3 is a flow chart illustrating a method for checking and updating a plurality of best reference images, in accordance with an example embodiment.

Reference is now made to FIG. 3. FIG. 3 is a flow chart illustrating a method 250 for checking and updating a set of a plurality of best reference images based on confidence scores. Initially at action 254, a new license plate image is obtained. For example, an image of the front license plate 110 may be captured by the camera $20_i$. This captured image may then be processed to obtain a make & model, color and state by analytics (for example, employing the image analytics module 91), and a plate number (by OCR), and also a feature vector. Regarding obtaining the make & model, in some instances better results occur when, in addition to the entire license plate, all or the majority of a two-dimensional representation of the vehicle is clearly visible within the captured image; however this is not necessarily the case for all instances, and indeed it may be possible to satisfactorily obtain the make & model when less than the majority a two-dimensional representation of the vehicle is visible within the captured image.

Next in the method 250, a database (for example, the database 81) is searched (258) based on the license plate depicted in the newly captured image.

Next is decision action 262, namely whether the license plate depicted in the newly captured image is a match to any known license plate (for example, existence of a match in the database 81). If "NO", then the new license plate is added (266) to the database. If "YES", then decision action 270 follows, which involves determining whether or not the new image is a best reference image in at least one respect.

Say, for the purpose of providing an illustrative example, the newly captured image was taken at daytime. When this new image is processed, we have the following in respect of the image: i) plate number is 'ABC1Z34' with a confidence score of 90%; and ii) color is blue with a confidence score of 92%.

Now say that, based on feature vector comparison, a match is found in the database 81. Then say the match corresponds to a previously captured (and stored) image depicting the matching license plate that was taken at nighttime. Those skilled in the art will appreciate that processing an image captured during daytime versus nighttime may impact the resultant confidence scores (for example, there may be lower or poor confidence scores corresponding to identification values for color and make & model, in relation to images captured during the nighttime).

Continuing on in respect of this stored image: i) plate number is 'ABC1234' with a confidence of score 99% (high confidence score because image depicting the license plate captured, by an infrared camera, during nighttime conditions when it was very clear); and ii) color is black with a confidence score of 50%.

So the color reading in respect of the newly captured image is better (i.e. higher confidential score) than in respect of the stored image in the database 81. This corresponds to "YES" in relation to the decision action 270 (the newly captured image is a best reference in at least one respect, i.e. color). Accordingly, updating (274) of the one or more best reference records follows the decision action 270 (in a maintained and stored matrix of license plate identification values, at least one of the values is changed).

Still with reference to the 'ABC1234' license plate example, we can update the color value in the matrix of license plate identification values obtained from best references (value of color changes to blue, along with a new confidential score of 90%).

As a result, the matrix of license plate identification values stored in the database 81 will change as follows: (plate_number:='ABC1234'; plate_number_confidence_score:=0.99; plate_color:='black'; plate_color_confidence_score:=0.50; . . . ) to (plate_number:='ABC1234'; plate_number_confidence_score:=0.99; plate_color:='blue'; plate_color_confidence_score:=0.92; . . . ).

Figure 4:
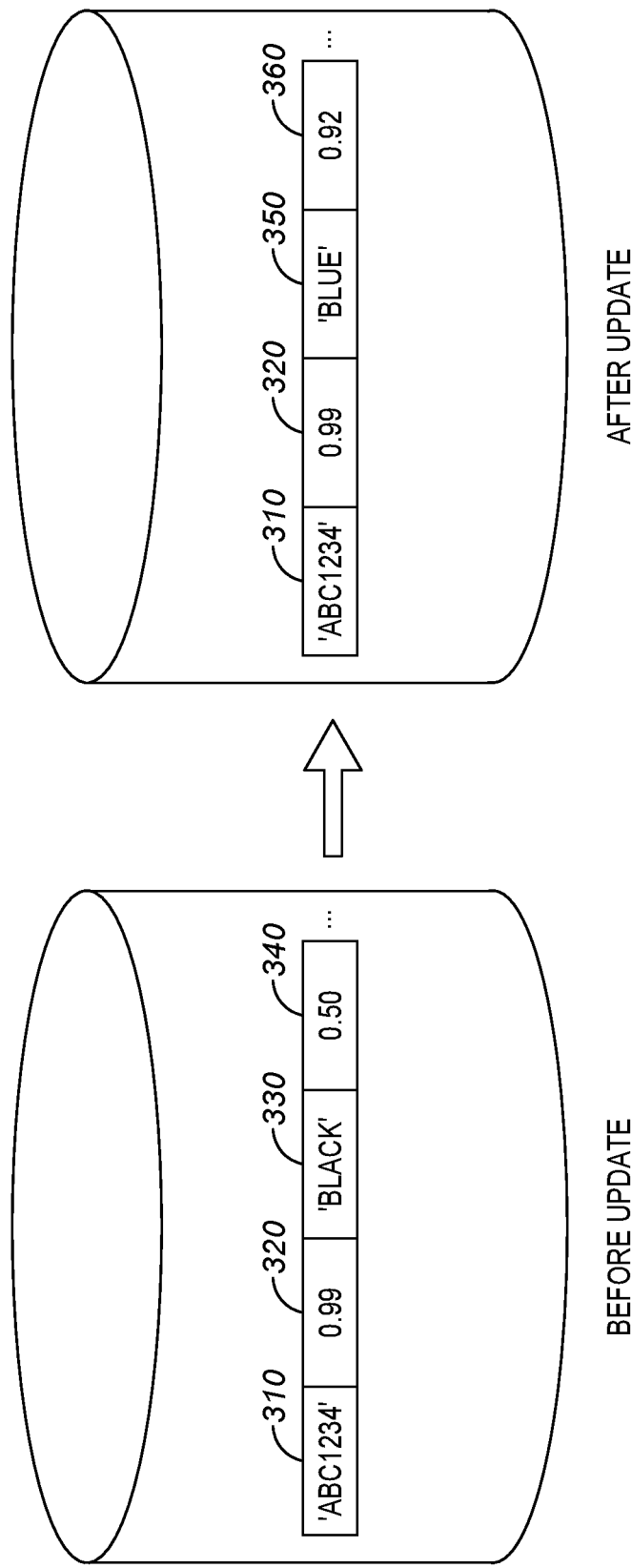
FIG. 4 is a diagram illustrating example details in relation to the example embodiment of FIG. 3.

The diagram of FIG. 4 illustrates the above.

Table 1 below provides a legend in relation to the reference numbers shown in FIG. 4.

TABLE 1

| Reference Numbers in FIG. 4 | |
|---|---|
| Variable | Reference Number |
| plate_number | 310 |
| plate_number_confidence_score | 320 |
| plate_color (with old value) | 330 |
| plate_color_confidence_score (with old value) | 340 |
| plate_color (with updated value) | 350 |
| plate_color_confidence_score (with updated value) | 360 |

It should be noted that, in this example, the plate number value was not updated in the matrix of license plate identification values (i.e. the plate number 'ABC1234' had a higher confidential score than the plate number 'ABC1Z34' obtained by OCR from the newly captured image).

Also, each of the plurality of images taken over time of a same unique license plate may be associated with the last updated matrix of license plate identification values rather than respective values determined in relation to the individual image at respective times. For instance, in relation to the above-described example, the image of the license plate that was taken during daytime is associated with a different and better plate number value obtained earlier in time, whereas the image of the license plate that was taken during nighttime is associate with a different and better color identifying value.

With reference once again to the decision action 270, in the case where the newly captured image is not a best reference in relation to any of the values in the matrix of license plate identification values, then the method ends (280) without any update to the matrix of license plate identification values stored in the database.

In accordance with the method 250, license plate information stored in the database may gradually become improved over time as more and more images of a repeat license plate are obtained. For any one particular image captured at one particular point in time, a random/chance factor (such as for example, image captured against bright sunlight, too much dirt on the license plate, sticky leaf or some other obstructive object covering part of the license plate, etc.) may make the particular image poor, in some respect, for obtaining one or more of a number of license plate identification values; however over time the chance of that same random/chance factor occurring over and over again should be less.

In some examples, confidence scores will range between and including 0% and 100%. In the case of certain identification values such as, for example, license plate numbers, 100% may be reserved for those identification values where the appropriate employee, from visual inspection of the image, has clearly confirmed the value to his/her satisfaction.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot carry out computerized image analytics on a plurality of images to identify a best reference image or images for respective plate-identifying information, among other features and functions set forth herein).

In the foregoing specification, specific embodiments have been described. However, one of ordinary skill in the art appreciates that various modifications and changes can be made without departing from the scope of the invention as set forth in the claims below. For example, the system 10 may optionally include a Video Management System (VMS) including VMS module 89 shown in FIG. 1 which may operate in providing complementary and integrated functionality with other analytics-supporting modules within the server 40. As appreciated by those skilled in the art, a VMS will typically collect video from cameras and other sources; record/store that video to a storage device; and provide an interface to both access recorded images and video, and to view live video.

Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method for progressively updating at least one matrix of license plate identification values stored in a database, the method comprising:
   capturing, at a first vehicle presence time, a first image within which is shown a uniquely identifiable license plate of a vehicle;
   carrying out analytics on the first image to obtain, in relation to the uniquely identifiable license plate, at least four values in relation to both a license plate number and at least one additional plate-identifying information, the at least four values including a first value that is obtained from a first automated analysis of the first image, a second value that is a first confidence score as to the first value matching the license plate number, a third value that is obtained from a second automated analysis of the first image, and a fourth value that is a second confidence score as to the third value matching the additional plate-identifying information;
   populating the matrix of license plate identification values with the at least four values;
   capturing, at a second vehicle presence time, a second image within which is shown the uniquely identifiable license plate of the vehicle, the second vehicle presence time being later in time than the first vehicle presence time;
   determining that there is a license plate match as between the first image and the second image;
   carrying out analytics on the second image to obtain, in relation to the uniquely identifiable license plate, at least four additional values in relation to both the license plate number and the at least one additional plate-identifying information, the at least four additional values including a fifth value that is obtained from a third automated analysis of the second image, a sixth value that is a third confidence score as to the fifth value matching the license plate number, a seventh value that is obtained from a fourth automated analysis of the second image, and an eighth value that is a fourth confidence score as to the seventh value matching the additional plate-identifying information;
   carrying out a first comparison of the first confidence score to the third confidence score to establish a first replacement indicator only when the third confidence score is higher than the first confidence score;
   selectively replacing, within the matrix of license plate identification values, the first value with the fifth value based on whether or not the first replacement indicator has been established;
   carrying out a second comparison of the second confidence score to the fourth confidence score to establish a second replacement indicator only when the fourth confidence score is higher than the second confidence score; and
   selectively replacing, within the matrix of license plate identification values, the third value with the seventh value based on whether or not the second replacement indicator has been established.

2. The method as claimed in claim 1 wherein the third and seventh values are color identifying values.

3. The method as claimed in claim 2 wherein the capturing of the first image occurs during nighttime, the capturing of the second image occurs during daytime, and the second replacement indicator established that the fourth confidence score is higher than the second confidence score such that the seventh value replaces the third value within the matrix of license plate identification values.

4. The method as claimed in claim 1 wherein the third and seventh values are make & model identifying values.

5. The method as claimed in claim 1 wherein the third and seventh values are state/province identifying values.

6. The method as claimed in claim 1 wherein the second, fourth, sixth and eighth values are in a range between and including 0% and 100%.

7. The method as claimed in claim 1 wherein the capturing of the first image is carried out by a first camera, and the capturing of the second image is carried out by a second camera different from the first camera.

8. The method as claimed in claim 7 wherein the database forms part of a server remote from the first and second cameras, and the server is coupled to the first and second cameras via at least one wide area network.

9. The method as claimed in claim 1 wherein at least a majority a two-dimensional representation of the vehicle is visible within at least one of the first and second image.

10. The method as claimed in claim 1 wherein the capturing of the first image and the capturing of the second image are carried out by one or more License Plate Recognition cameras.

11. A system comprising:
    a first camera configured to capture, at a first vehicle presence time, a first image within which is shown a uniquely identifiable license plate of a vehicle;
    a second camera configured to capture, at a second vehicle presence time, a second image within which is shown the uniquely identifiable license plate of the vehicle, the second vehicle presence time being later in time than the first vehicle presence time;
    a computer-readable medium having a database configured to store an at least one matrix of license plate identification values; and
    at least one processor communicatively coupled to the computer-readable medium, the at least one processor configured to:
       carry out analytics on the first image to obtain, in relation to the uniquely identifiable license plate, at least four values in relation to both a license plate number and at least one additional plate-identifying information, the at least four values including a first value that is obtained from a first automated analysis of the first image, a second value that is a first confidence score as to the first value matching the license plate number, a third value that is obtained from a second automated analysis of the first image, and a fourth value that is a second confidence score as to the third value matching the additional plate-identifying information;

populate the matrix of license plate identification values with the at least four values;

determine that there is a license plate match as between the first image and the second image;

carry out analytics on the second image to obtain, in relation to the uniquely identifiable license plate, at least four additional values in relation to both the license plate number and the at least one additional plate-identifying information, the at least four additional values including a fifth value that is obtained from a third automated analysis of the second image, a sixth value that is a third confidence score as to the fifth value matching the license plate number, a seventh value that is obtained from a fourth automated analysis of the second image, and an eighth value that is a fourth confidence score as to the seventh value matching the additional plate-identifying information;

carry out a first comparison of the first confidence score to the third confidence score to establish a first replacement indicator only when the third confidence score is higher than the first confidence score;

selectively replace, within the matrix of license plate identification values, the first value with the fifth value based on whether or not the first replacement indicator has been established;

carry out a second comparison of the second confidence score to the fourth confidence score to establish a second replacement indicator only when the fourth confidence score is higher than the second confidence score; and selectively replace, within the matrix of license plate identification values, the third value with the seventh value based on whether or not the second replacement indicator has been established.

12. The system as claimed in claim 11 wherein the first camera and the second camera are different cameras.

13. The system as claimed in claim 11 wherein the third and seventh values are color identifying values.

14. The system as claimed in claim 11 wherein the third and seventh values are make & model identifying values.

15. The system as claimed in claim 11 wherein the third and seventh values are state/province identifying values.

16. The system as claimed in claim 11 wherein the second, fourth, sixth and eighth values are in a range between and including 0% and 100%.

17. The system as claimed in 11 further comprising a server remote from the first and second cameras, and wherein the server contains the computer-readable medium and is coupled to the first and second cameras via at least one wide area network.

18. The system as claimed in claim 11 wherein the first camera is of a different type than the second camera.

19. The system as claimed in claim 11 wherein at least a majority a two-dimensional representation of the vehicle is visible within at least one of the first and second image.

20. The system as claimed in claim 11 wherein both the first camera and the second camera are License Plate Recognition cameras.

* * * * *